United States Patent
Soga et al.

(10) Patent No.: US 6,946,024 B2
(45) Date of Patent: *Sep. 20, 2005

(54) INK COMPOSITION FOR INKJET RECORDING, INK CARTRIDGE, AND RECORDING APPARATUS

(75) Inventors: Mamoru Soga, Osaka (JP); Hidekazu Arase, Hyogo (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/438,602

(22) Filed: May 15, 2003

(65) Prior Publication Data

US 2003/0213403 A1 Nov. 20, 2003

(30) Foreign Application Priority Data

May 15, 2002 (JP) .......................... 2002-139791
May 15, 2002 (JP) .......................... 2002-139792

(51) Int. Cl.⁷ .......................... C09D 11/02; G01D 11/00
(52) U.S. Cl. ................ 106/31.27; 106/31.6; 106/31.58; 106/31.86; 106/31.47; 106/31.77; 347/100
(58) Field of Search .................. 106/31.27, 31.6, 106/31.58, 31.86, 31.47, 31.77; 347/100

(56) References Cited

U.S. PATENT DOCUMENTS

| | | | | |
|---|---|---|---|---|
| 5,558,700 A | * | 9/1996 | Shibahashi et al. ...... | 106/31.15 |
| 6,007,610 A | * | 12/1999 | Matzinger et al. ....... | 106/14.05 |
| 6,087,416 A | * | 7/2000 | Pearlstine et al. .......... | 523/160 |
| 6,123,758 A | * | 9/2000 | Colt ........................ | 106/31.43 |
| 6,143,807 A | * | 11/2000 | Lin et al. ..................... | 523/161 |
| 6,153,001 A | * | 11/2000 | Suzuki et al. ............ | 106/31.65 |
| 6,264,730 B1 | | 7/2001 | Matsumura et al. ..... | 106/31.43 |
| 6,419,732 B1 | * | 7/2002 | Matsumura et al. ..... | 106/31.75 |
| 6,676,735 B2 | * | 1/2004 | Oki et al. ................. | 106/31.46 |
| 2003/0137570 A1 | * | 7/2003 | Smith et al. ................. | 347/100 |
| 2003/0197769 A1 | * | 10/2003 | Soga et al. ................. | 347/100 |
| 2003/0221586 A1 | * | 12/2003 | Arase et al. ............. | 106/31.27 |

FOREIGN PATENT DOCUMENTS

| | | |
|---|---|---|
| JP | 10-212439 | 8/1998 |
| JP | 11-293167 | 10/1999 |
| JP | 11-315231 | 11/1999 |
| JP | 2000-178494 | 6/2000 |

* cited by examiner

*Primary Examiner*—J. A. Lorengo
*Assistant Examiner*—Veronica F. Faison
(74) *Attorney, Agent, or Firm*—Harness, Dickey & Pierce, P.L.C.

(57) ABSTRACT

An ultraviolet absorber having an acidic group is further added to an ink composition for inkjet recording which contains a colorant, a humectant, water, and a water-soluble substance that is condensation-polymerized in the absence of the water. A radical trapping agent having an acidic group is further added to an ink composition for inkjet recording which contains a colorant, a humectant, water, and a water-soluble substance that is condensation-polymerized in the absence of the water.

17 Claims, 3 Drawing Sheets

INK COMPOSITION FOR INKJET RECORDING, INK CARTRIDGE, AND RECORDING APPARATUS

BACKGROUND OF THE INVENTION

1. Field of the Invention

The present invention falls within the technical field that relates to an ink composition for inkjet recording, an ink cartridge and a recording apparatus which are suitable for inkjet recording.

2. Description of the Prior Art

Conventionally, ink containing a colorant (dye or pigment), a humectant and water has been well known as ink used for inkjet recording. However, in the case of forming an image with the ink on a recording medium, the water-resistivity of the image is a matter of concern, i.e., there is a problem such that the colorant exudes into water when the image is exposed to water. Especially when an image is recorded on plain paper, the water-resistivity of the image is very poor. (The "plain paper" herein refers to paper which is one of various types of commercially-available paper, which is especially used for an electrophotographic copying machine, and which is produced without an intention to have an optimum structure, composition, properties, or the like, for inkjet recording.)

In Japanese Unexamined Patent Publication No. 10-212439, Japanese Unexamined Patent Publication No. 11-293167, Japanese Unexamined Patent Publication No. 11-315231, and Japanese Unexamined Patent Publication No. 2000-178494, adding a hydrolyzable silane compound (organic silicon compound) to ink in order to improve the water-resistivity of an image formed with the ink on a recording medium has been proposed. When a drop of such ink containing a silane compound is adhered on a recording medium, and a water content (solvent) of the ink drop evaporates or permeates into the recording medium, the silane compound remaining on the recording medium is condensation-polymerized, and this condensation-polymerized silane compound encloses a colorant. As a result, even when the image formed on the recording medium is exposed to water, the colorant is prevented from exuding into the water.

The water-resistant ink disclosed in each of the above publications provides a beneficial effect-of improving the water-resistivity. However, if an image formed with such water-resistant ink is stored for a long time, the color of the image fades away. It is estimated that this problem is caused by the following mechanism. When the image formed with the water-resistant ink on the recording medium is exposed to light (ultraviolet light) from the sun or a fluorescent lamp, the energy of the light attacks the azo group (—N=N—) of the colorant. As a result, a double bond of the azo group is changed into a single bond, or the double bond is cleaved, whereby the structure of the colorant is decomposed. The decomposition of the colorant structure causes a change in hue of the image and/or a decrease in color depth of the image (i.e., fading of color of the image).

Furthermore, in the case where an image formed on a recording medium with the water-resistant ink disclosed in the above publications is stored for a long time, the color of the image fades away even in the case where it is not exposed to ultraviolet light. It is estimated that this problem is caused by the following mechanism. The azo group (—N=N—) of the colorant is attacked by peroxyradical or ozone which is generated during the process of thermal oxidation caused by heat, moisture, and/or a chemical substance, etc., whereby the structure of the colorant is decomposed.

For example, Japanese Unexamined Patent Publication No. 2001-240778 proposes adding thiocyanate to commonly-employed ink which does not have water-resistivity (i.e., ink not containing an organic silicon compound) in order to improve the ozone-resistance of the ink. Such a proposition suggests adding the thiocyanate to the above water-resistant ink for the purpose of improving the weatherability of the ink.

However, it was confirmed that only adding thiocyanate to the water-resistant ink does not much improve the weatherability of an image formed with the ink. Furthermore, it was also confirmed that if the image formed with the ink is once exposed to water, the weatherability of the image significantly deteriorates.

SUMMARY OF THE INVENTION

The present invention was conceived in view of the above circumstances. An objective of the present invention is to provide an ink composition for inkjet recording in which light-resistance and weatherability are improved while the water-resistivity of an image formed with the ink is maintained.

An ink composition of the present invention is an ink composition used for inkjet recording which includes a colorant, a humectant, water, and a water-soluble substance that is condensation-polymerized in the absence of the water. This ink composition further includes an ultraviolet absorber having an acidic group.

The "ultraviolet absorber" includes a substance which absorbs ultraviolet light and converts the light energy of the ultraviolet light to thermal energy, or the like.

According to this structure, when the ink composition is adhered in the form of an ink drop onto a recording medium (e.g., paper), the water content of the ink drop evaporates or permeates into the recording medium, so that the water-soluble substance is condensation-polymerized, and a product of the condensation-polymerization encloses the colorant. Thus, even when an image formed with the ink drop is exposed to water, the colorant is prevented from being exuding into the water. As a result, the water-resistivity of the image is secured.

The ink composition further includes an ultraviolet absorber. Thus, even when an image formed with the ink composition on a recording medium is irradiated with ultraviolet light, the ultraviolet light is absorbed by the ultraviolet absorber, whereby the light energy is converted to thermal energy. As a result, a change of the quality of the colorant is suppressed, and deterioration of the light-resistance is suppressed.

In the above ink, the colorant and the water-soluble substance exist in the vicinity of each other because of an interaction which occurs therebetween. Thus, when the water-soluble substance is condensation-polymerized, a product of the condensation-polymerization encloses the colorant. On the other hand, since the ultraviolet absorber contained in the ink composition has an acidic group, the ultraviolet absorber also exists in the vicinity of the water-soluble substance in the ink because of an interaction between the ultraviolet absorber and the water-soluble substance. Thus, when the water-soluble substance is condensation-polymerized, a product of the condensation-polymerization encloses not only the colorant but also the ultraviolet absorber. Accordingly, on the recording medium, the ultraviolet absorber exists in the vicinity of the colorant. As a result, irradiation of the ultraviolet light onto the colorant is effectively blocked, and the light resistance is significantly improved.

Furthermore, even if the image on the recording medium is exposed to water, the ultraviolet absorber is also prevented from exuding into the water as the colorant is, because the ultraviolet absorber is enclosed by the water-soluble substance. Thus, deterioration of the light-resistance is still suppressed even after the image on the recording medium is exposed to water.

That is, if the ultraviolet absorber does not have an acidic group, an interaction between the ultraviolet absorber and the water-soluble substance is weak. Therefore, the ultraviolet absorber is not enclosed by the product of the condensation-polymerization of the water-soluble substance. In this case, when an image on a recording medium is exposed to water, the ultraviolet absorber exudes into the water. As a result, the light-resistance of the image deteriorates.

According to the present invention, on the other hand, an ultraviolet absorber has an acidic group, and therefore, the colorant and the ultraviolet absorber are enclosed together by the product of the condensation-polymerization of the water-soluble substance. As a result, the colorant and the ultraviolet absorber exist in the vicinity of each other as described above. Accordingly, as a matter of course, the water-resistivity of the image is secured, and furthermore, high-level light-resistance is obtained. In addition to these advantages, since the ultraviolet absorber does not exude into the water, deterioration of light-resistance is suppressed even after the image on the recording medium is exposed to water.

Herein, a preferable water-soluble substance is a hydrolyzable silane compound. The silane compound is highly preferable because it improves the water-resistivity. The product of the condensation-polymerization of the silane compound securely encloses the ultraviolet absorber, and therefore, the light-resistance can be improved.

The ultraviolet absorber may be a benzophenone compound, a benzotriazole compound, or a salicylate compound. The acidic group of the ultraviolet absorber may be sodium sulfonate or sodium carboxylate. Among these acidic groups, sodium sulfonate is preferable in consideration of the solubility in water.

Preferably, the above ink composition further contains a penetrant. In such a case, after an ink drop of the ink composition is adhered onto a recording medium (e.g., paper), the solvent of the ink composition which includes a humectant, a penetrant, and water quickly permeates into the recording medium. Accordingly, the condensation-polymerization of the water-soluble substance is quickly performed so that the colorant and the ultraviolet absorber are securely enclosed. As a result, the water-resistivity of the image is further improved.

An ink cartridge of the present invention is an ink cartridge which comprises an ink composition for inkjet recording. The ink composition includes a colorant, a humectant, water, a water-soluble substance that is condensation-polymerized in the absence of the water, and an ultraviolet absorber having an acidic group.

A recording apparatus of the present invention includes an ink composition for inkjet recording and ejects the ink composition toward a recording medium. The ink composition includes a colorant, a humectant, water, a water-soluble substance that is condensation-polymerized in the absence of the water, and an ultraviolet absorber having an acidic group.

Another ink composition of the present invention is an ink composition used for inkjet recording which includes a colorant, a humectant, water, and a water-soluble substance that is condensation-polymerized in the absence of the water. This ink composition further includes a radical trapping agent having an acidic group.

According to this structure, the ink composition contains the radical trapping agent. Thus, when an image formed with the ink composition on a recording medium is exposed to peroxyradical or ozone, the radical trapping agent traps peroxyradical or ozone, whereby the colorant is prevented from being attacked by peroxyradical or ozone. As a result, a change of the quality of the colorant is suppressed, and deterioration of the weatherability is suppressed.

Especially, since the radical trapping agent has an acidic group, the radical trapping agent and the water-soluble substance exist in the vicinity of each other in the ink because of an interaction which occurs therebetween. Furthermore, in this ink, the colorant also exists in the vicinity of the water-soluble substance because of an interaction between the colorant and the water-soluble substance. Thus, when the water-soluble substance is condensation-polymerized, the colorant and the radical trapping agent are enclosed together by a product of the condensation-polymerization of the water-soluble substance. As a result, on the recording medium, the radical trapping agent exists in the vicinity of the colorant, so that the radical trapping agent effectively blocks the colorant from being attacked by peroxyradical or ozone. Therefore, the weatherability is significantly improved. Furthermore, the radical trapping agent is enclosed by the water-soluble substance, and thus, even when an image on the recording medium is exposed to water, the radical trapping agent is prevented from exuding into the water as the colorant is. Therefore, even when the image on the recording medium is once exposed to water, the weatherability of the image does not deteriorate.

That is, it is estimated that since the ultraviolet absorber having no acidic group has a weak interaction with the water-soluble substance, the radical trapping agent is not, or is unlikely to be, enclosed by the condensation-polymerized water-soluble substance. Thus, it is estimated that, when an image on a recording medium is exposed to water, the radical trapping agent having no acidic group exudes into the water. As a result, the weatherability of the image deteriorates.

The radical trapping agent may be a phenolic compound or a sulfur compound. The acidic group of the radical trapping agent may be sodium sulfonate or sodium carboxylate. Among these compounds, sodium sulfonate is preferable in consideration of the solubility in water.

Another ink cartridge of the present invention is an ink cartridge which comprises an ink composition for inkjet recording. The ink composition includes a colorant, a humectant, water, a water-soluble substance that is condensation-polymerized in the absence of the water, and a radical trapping agent having an acidic group.

Another recording apparatus of the present invention includes an ink composition for inkjet recording and ejects the ink composition toward a recording medium. The ink composition includes a colorant, a humectant, water, a water-soluble substance that is condensation-polymerized in the absence of the water, and a radical trapping agent having an acidic group.

DESCRIPTION OF THE PREFERRED EMBODIMENTS

Structure of Recording Apparatus

Figure 1:
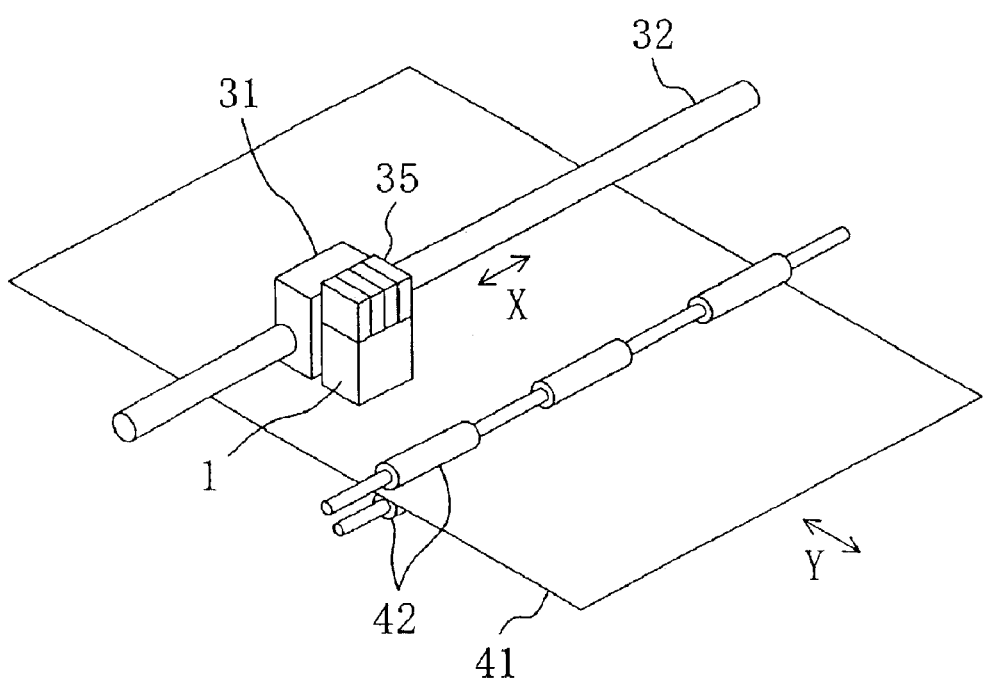
FIG. 1 is a general perspective view showing an inkjet-type recording apparatus including ink for inkjet recording according to an embodiment of the present invention.

FIG. 1 generally shows an inkjet-type recording apparatus A including an ink composition for inkjet recording according to an embodiment of the present invention. The recording apparatus A has an inkjet head 1. The inkjet head 1 ejects the ink onto recording paper 41 in a manner described later. On the upper surface of the inkjet head 1, an ink cartridge 35 including the ink is attached.

The inkjet head 1 is fixedly supported by a carriage 31. The carriage 31 is provided with a carriage motor (not shown). The inkjet head 1 and the carriage 31 are reciprocated by the carriage motor along a major scanning direction (X direction in FIGS. 1 and 2) while being guided by a carriage shaft 32 that extends along the major scanning direction.

The recording paper 41 is sandwiched by two transfer rollers 42 which are rotated by a transfer motor (not shown). Under the inkjet head 1, the recording paper 41 is transferred by the transfer motor and transfer rollers 42 along the minor scanning direction which is perpendicular to the major scanning direction (Y direction in FIGS. 1 and 2).

As described above, the recording apparatus A is structured such that the inkjet head 1 and the recording paper 41 are relatively moved with respect to each other by the carriage 31, the carriage shaft 32 and the carriage motor, and the transfer rollers 42 and the transfer motor.

Figure 2:
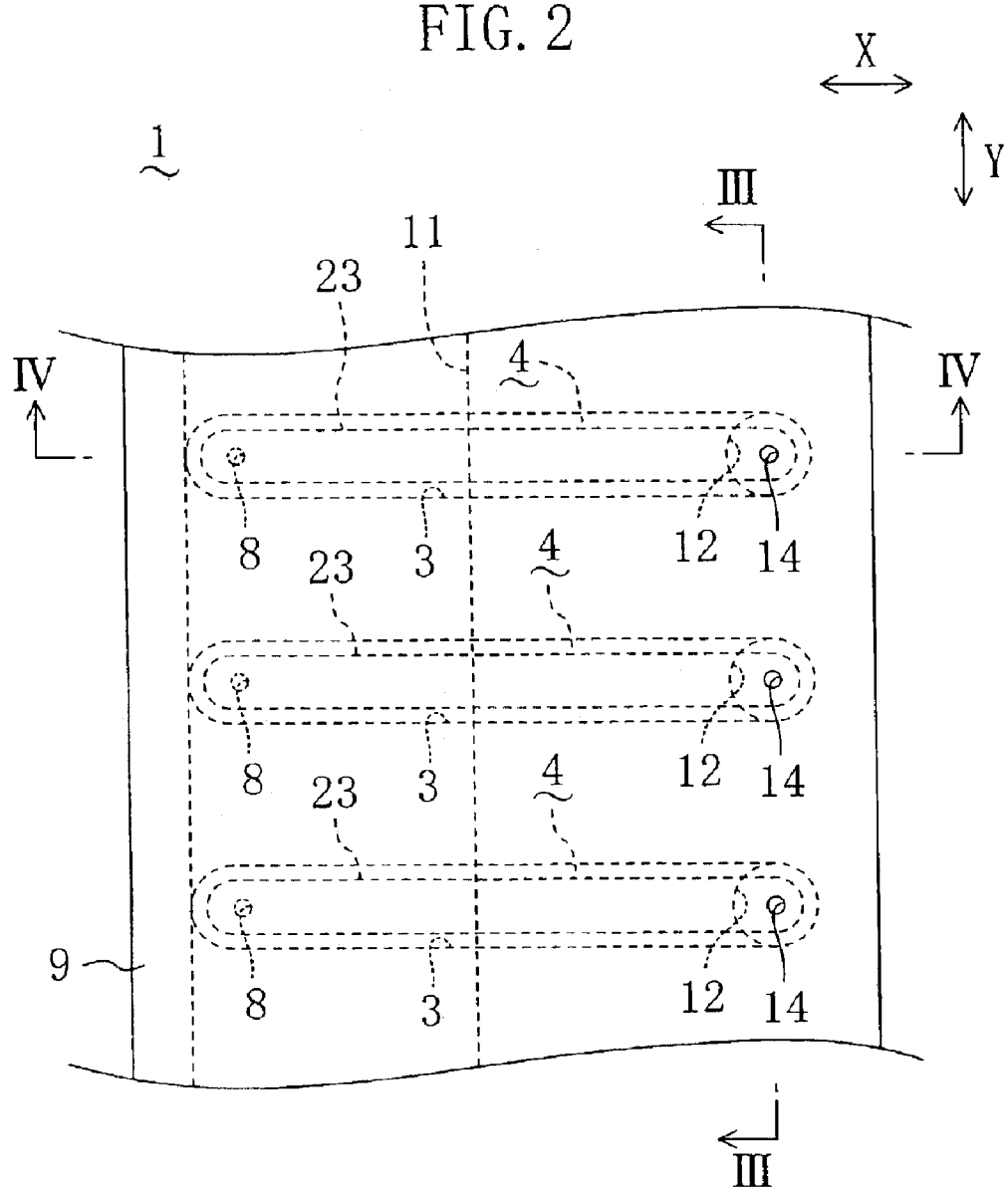
FIG. 2 shows a portion of a bottom surface of an inkjet head of the inkjet-type recording apparatus.
Figure 3:
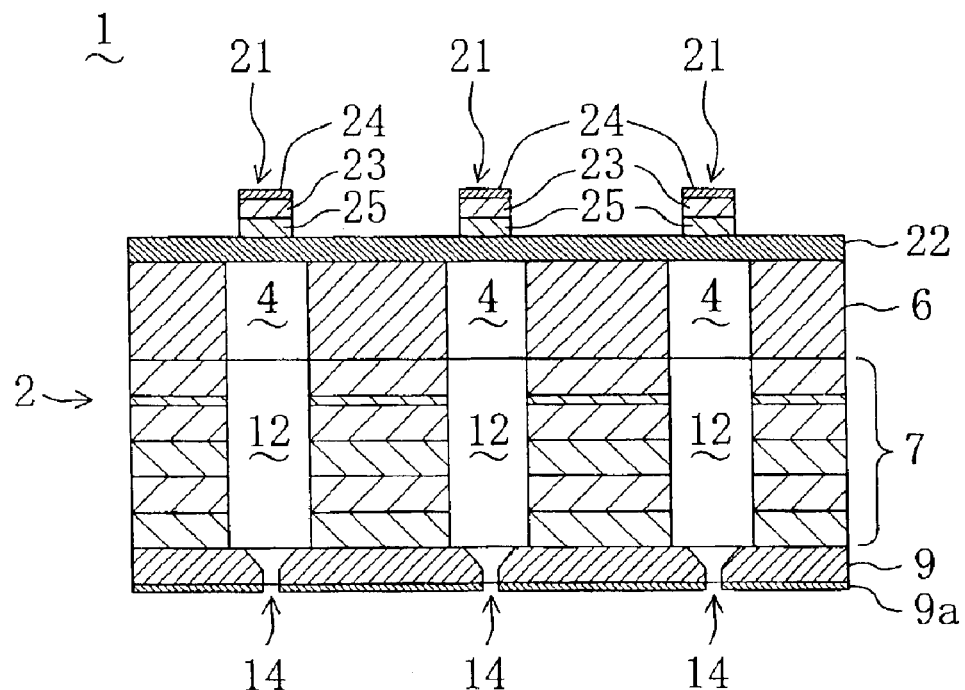
FIG. 3 is a cross-sectional view taken along line III—III of FIG. 2.
Figure 4:
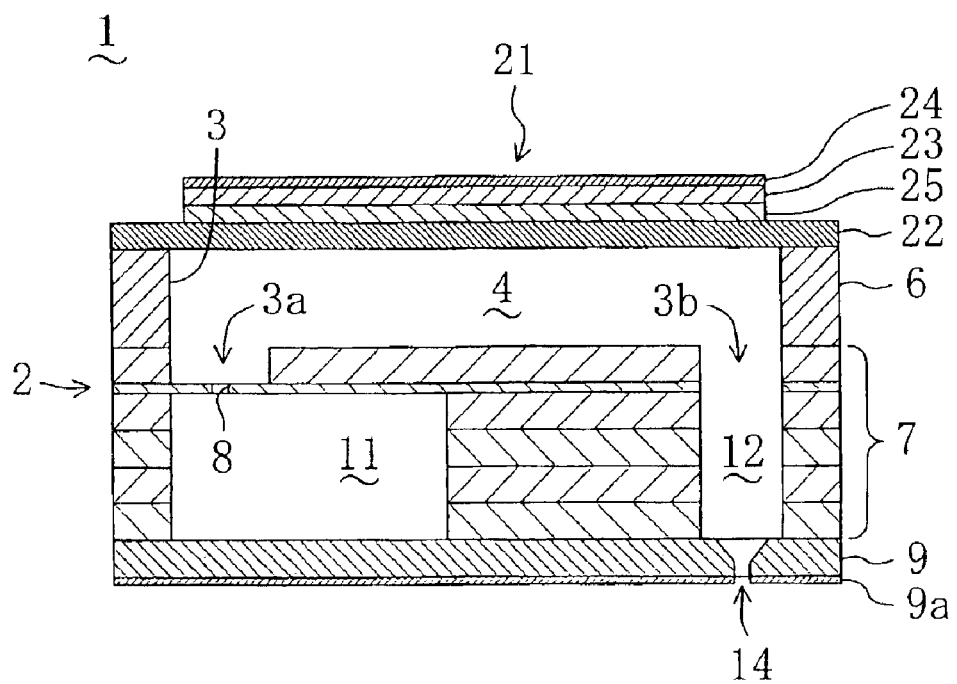
FIG. 4 is a cross-sectional view taken along line IV—IV of FIG. 2.

Referring to FIGS. 2 through 4, the inkjet head 1 includes a head main body 2. The head main body 2 has a plurality of concaved portions 3 for pressure rooms. Each of the concaved portions 3 of the head main body 2 has a supply hole 3a for supplying ink and an ejection hole 3b for ejecting the ink. The concaved portions 3 are opened in the upper surface of the head main body 2 such that the openings extend along the major scanning direction, and arranged along the minor scanning direction with generally-equal intervals therebetween. The length of the opening of each concaved portion 3 is set to about 1250 $\mu$m, and the width thereof is set to about 130 $\mu$m. Opposite ends of the opening of each concaved portion 3 have a generally-semicircular shape.

A side wall of each concaved portion 3 is formed by a pressure room member 6 made of photosensitive glass having a thickness of about 200 $\mu$m. A bottom wall of each concaved portion 3 is formed by an ink passage member 7 which is adhesively fixed onto the lower surface of the pressure room member 6. The ink passage member 7 is a laminate of six thin plates of stainless steel. The ink passage member 7 has a plurality of orifices 8, one ink supply passage 11, and a plurality of ink ejection passages 12. Each of the orifices 8 is connected to the supply hole 3a of a corresponding one of the concaved portions 3. The ink supply passage 11 extends along the minor scanning direction and is connected to the orifices 8. Each of the ink ejection passages 12 is connected to the ejection hole 3b of a corresponding one of the concaved portions 3.

Each orifice 8 is formed in the thin stainless steel plate which is the second from the top of the ink passage member 7, and whose thickness is smaller than the others. The diameter of the orifice 8 is set to about 38 $\mu$m. The ink supply passage 11 is connected to the ink cartridge 35, such that the ink is supplied from the ink cartridge 35 into the ink supply passage 11.

A nozzle plate 9 made of stainless steel is adhesively fixed onto the lower surface of the ink passage member 7. The nozzle plate 9 has a plurality of nozzles 14 for ejecting ink drops toward the recording paper 41. The lower surface of the nozzle plate 9 is covered with a water-repulsive film 9a. The nozzles 14 are aligned in a row on the lower surface of the inkjet head 1 along the minor scanning direction. The nozzles 14 are connected to the ink ejection passages 12 so as to have a communication with the ejection holes 3b of the concaved portions 3 through the ink ejection passages 12. Each nozzle 14 includes a tapered portion, where the nozzle diameter gradually decreases along a direction toward a nozzle tip side, and a straight portion provided at the nozzle tip side of the tapered portion. The nozzle diameter of the straight portion is set to about 20 $\mu$m.

Piezoelectric actuators 21 are provided above the concaved portions 3 of the head main body 2. Each of the piezoelectric actuators 21 has a diaphragm 22 made of Cr. The diaphragm 22 is adhesively fixed onto the upper surface of the head main body 2 so as to cover the concaved portions 3 of the head main body 2, such that the diaphragm 22 and the concaved portions 3 form pressure rooms 4. The diaphragm 22 is made of a single plate which is commonly used for all of the actuators 21. The diaphragm 22 also functions as a common electrode which is commonly used for all of piezoelectric elements 23 (described later).

Each piezoelectric actuator 21 has a piezoelectric element 23 made of lead zirconate titanate (PZT) and an individual electrode 24 made of Pt. On a surface of the diaphragm 22 which is opposite to the pressure room 4 (i.e., the upper surface of the diaphragm 22), an intermediate layer 25 made of Cu is provided at a portion of the surface which corresponds to the pressure room 4 (a portion above the opening of the concaved portion 3), and the piezoelectric element 23 is provided on the intermediate layer 25. The individual electrode 24 is bonded onto a surface of the piezoelectric element 23 which is opposite to the diaphragm 22 (i.e., the upper surface of the piezoelectric element 23). Each individual electrode 24 functions together with the diaphragm 22 to apply a voltage (driving voltage) to a corresponding one of the piezoelectric elements 23.

All of the diaphragm 22, the piezoelectric elements 23, the individual electrodes 24 and the intermediate layers 25 are formed of thin films. The thickness of the diaphragm 22 is set to about 6 $\mu$m. The thickness of each piezoelectric element 23 is set to 8 $\mu$m or smaller (e.g., about 3 $\mu$m). The thickness of each individual electrode 24 is set to about 0.2 $\mu$m. The thickness of each intermediate layer 25 is set to about 3 $\mu$m.

Each piezoelectric actuator 21 applies a driving voltage to the piezoelectric element 23 through the diaphragm 22 and the individual electrode 24, thereby deforming a portion of the diaphragm 22 which corresponds to the pressure room 4 (a portion of the diaphragm 22 at the opening of the concaved portion 3). As a result of the deformation of the diaphragm 22, the ink in the pressure room 4 is ejected from the nozzle 14 through the ejection hole 3b. That is, when a pulse-shaped voltage is applied between the diaphragm 22 and the individual electrode 24, the piezoelectric element 23 shrinks in the width direction of the piezoelectric element 23, which is perpendicular to the thickness direction thereof, in response to a rising edge of the pulse voltage because of a piezoelectric effect. On the other hand, the diaphragm 22, the individual electrode 24 and the intermediate layer 25 do not shrink even when the pulse voltage is applied. As a result, a portion of the diaphragm 22 which corresponds to the pressure room 4 is flexibly deformed into the shape of a convex toward the pressure room 4 because of a so-called bimetal effect. This flexible deformation increases the pressure inside the pressure room 4, and because of this increased pressure, the ink in the pressure room 4 is squeezed out of the nozzle 14 through the ejection hole 3b and the ink ejection passages 12. Then, the piezoelectric element 23 expands in response to a falling edge of the pulse voltage so that the portion of the diaphragm 22 which corresponds to the pressure room 4 recovers its original shape. At this time, the ink squeezed out of the nozzle 14 is separated from the ink remaining in the ink ejection passage 12, whereby the separated ink is released as an ink drop (e.g., 3 pl) toward the recording paper 41. The released ink drop adheres onto the recording paper 41 in the form of a dot. On the other hand, when the diaphragm 22 flexibly deformed in the shape of a convex recovers its original shape, the pressure room 4 is charged with ink supplied from the ink cartridge 35 through the ink supply passage 11 and the supply hole 3a. The pulse voltage applied to the piezoelectric elements 23 is not limited to the voltage of push-up/pull-down type as described above, but may be a voltage of pull-down/push-up type which falls from the first voltage to the second voltage that is lower than the first voltage and then rises to the first voltage.

The application of the driving voltage to each piezoelectric element 23 is performed at a predetermined time interval (for example, about 50 μm: driving frequency=20 kHz) while the inkjet head 1 and the carriage 31 are moved from one edge to the other edge of the recording paper 41 at a generally uniform speed along the major scanning direction. It should be noted, however, that the voltage is not applied when the inkjet head 1 resides above a portion of the recording paper 41 where an ink drop is not to be placed. In this way, an ink drop is placed at a predetermined position. After recording of one scanning cycle completes, the recording paper 41 is transferred by a predetermined distance along the minor scanning direction by the transfer motor and the transfer rollers 42. Then, ink drops are ejected again while the inkjet head 1 and the carriage 31 are moved along the major scanning direction, whereby recording of another one scanning cycle is performed. This operation is repeated until a desired image is formed over the recording paper 41.

Ink Composition (Embodiment 1)

An ink composition used in the recording apparatus A contains a colorant (dye or pigment), a humectant for suppressing drying of the ink in the nozzle 14 of the inkjet head 1, or the like, a penetrant for enhancing the permeability of the ink (solvent) into the recording paper 41, water, and a water-soluble substance that is condensation-polymerized in the absence of the water.

The dye may be any type of dye but is preferably a water-soluble acid dye or direct dye.

Preferable pigments are shown below. For example, preferable black pigments include carbon black whose surface is treated with a diazonium salt and carbon black whose surface is treated by graft polymerization of a polymer.

Preferable color pigments include a pigment treated with a surface active agent, such as a formalin condensation product of naphthalene sulfonate, lignin sulfonic acid, dioctylsulfosuccinate, polyoxyethylene alkylamine, aliphatic acid ester, or the like. Specifically, examples of preferable cyan pigments include Pigment Blue 15:3, Pigment Blue 15:4, and aluminum phthalocyanine. Examples of preferable magenta pigments include Pigment Red 122 and Pigment Violet 19. Examples of preferable yellow pigments include Pigment Yellow 74, Pigment Yellow 109, Pigment Yellow 110, and Pigment Yellow 128.

The humectant is desirably a polyhydric alcohol, such as glycerol, 1,3-butanediol, or the like, or a water-soluble nitrogen heterocyclic compound, such as 2-pyrrolidone or N-methyl-2-pyrrolidone.

The penetrant is preferably monoalkylether of polyhydric alcohol, such as diethyleneglycol monobutylether, 2-butoxyethanol, or the like.

When a drop of the ink ejected from the nozzle 14 of the inkjet head 1 is adhered on the recording paper 41, and a water content (solvent) of the ink drop evaporates or permeates into the recording paper 41, the water-soluble substance is condensation-polymerized on the recording paper 41 to enclose a colorant of the ink. As a result, even when the image formed on the recording paper 41 is exposed to water, the colorant is prevented from exuding into the water. In this way, the water-resistivity of the image is improved. Specific examples of the water-soluble substance having such a function include hydrolyzable silane compounds, hydrolyzable titan compounds, and the like. Among these compounds, a hydrolyzable silane compound (organic silicon compound) is especially preferable in consideration of dissolution stability.

Furthermore, a compound having an amino group is more preferable as the water-soluble substance. This is because such a compound has a stronger interaction with an ultraviolet absorber or radical trapping agent having an acidic group, which will be described later.

A preferable organic silicon compound is a reaction product of hydrolysis of alkoxysilane containing an organic group that has an amino group and alkoxysilane not containing an amino group. Another preferable organic silicon compound is an organic silicon compound obtained by hydrolysis of a hydrolyzable silane that is produced by reacting an organic monoepoxy compound with a hydrolyzable silane having an amino group and a hydrolyzable silane not containing a nitrogen atom.

The ink composition of embodiment 1 further contains an ultraviolet absorber having an acidic group. The function of the ultraviolet absorber is to absorb ultraviolet light and converts the light energy of the ultraviolet light to thermal energy.

Specific examples of the ultraviolet absorber include benzophenone compounds, benzotriazole compounds, and salicylate compounds.

Examples of the acidic group of the ultraviolet absorber include sodium sulfonate and sodium carboxylate. Among these acidic groups, sodium sulfonate is preferable in consideration of the solubility in water.

Specific examples of the benzophenone compounds include compounds of "Chemical Formula 1-1" to "Chemical Formula 1-12" shown below. These compounds can readily be obtained by sulfonating a benzophenone compound commercially available as an ultraviolet absorber with a sulfuric acid, or by a Friedel-Crafts reaction of a phenyl compound with phthalic anhydride.

Chemical Formula 1-1

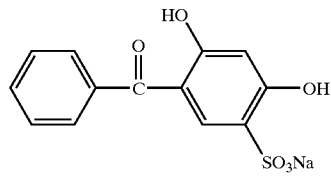

Chemical Formula 1-2

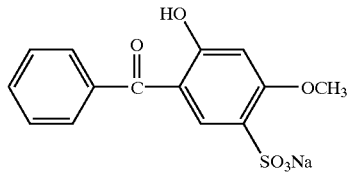

Chemical Formula 1-3

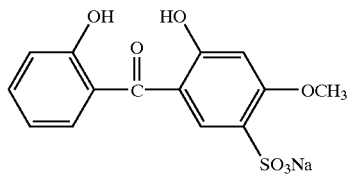

Specific examples of the benzotriazole compounds include compounds of "Chemical Formula 1-13" to "Chemical Formula 1-18" shown below. These compounds can readily be obtained by sulfonating a benzotriazole compound commercially available as an ultraviolet absorber with a sulfuric acid.

Chemical Formula 1-18

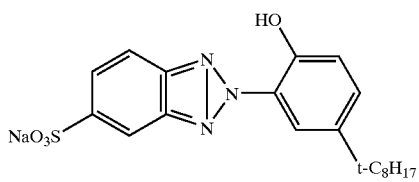

Specific examples of the salicylate compounds include compounds of "Chemical Formula 1-19" and "Chemical Formula 1-20" shown below. These compounds can readily be obtained by sulfonating a salicylate compound commercially available as an ultraviolet absorber with a sulfuric acid.

Chemical Formula 1-19

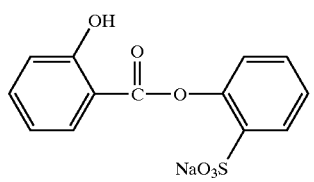

Chemical Formula 1-20

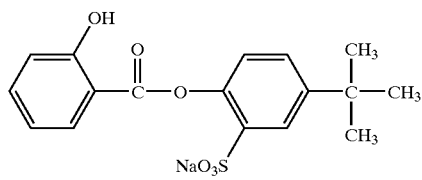

The ink composition of embodiment 1 includes a colorant, a humectant, a penetrant, water, and a hydrolyzable silane compound provided as the water-soluble substance that is condensation-polymerized in the absence of the water. Thus, in the case of using this ink to form an image on the recording paper 41 with the recording apparatus A, when an ink drop is adhered onto the recording paper 41, a solvent containing a humectant, a penetrant and water quickly penetrates into the recording paper 41. As a result, the silane compound is condensation-polymerized, and the condensation-polymerized silane compound encloses the colorant. Because of this mechanism, even if the image on the recording paper 41 is exposed to water, the colorant is prevented from exuding into the water.

The ink composition of embodiment 1 further includes an ultraviolet absorber having an acidic group. Because of the acidic group, this ultraviolet absorber has a strong interaction with a silane compound having an amino group. Thus, in the ink, the ultraviolet absorber exists in the vicinity of the silane compound as the colorant does. Therefore, when the silane compound is condensation-polymerized, the condensation-polymerized silane compound encloses not only the colorant but also the ultraviolet absorber. As a result, since the ultraviolet absorber exists in the vicinity of the colorant on the recording paper 41, ultraviolet light incident on the image formed on the recording paper 41 is absorbed by the ultraviolet absorber which exists in the vicinity of the colorant, and the light energy of the ultraviolet light is converted to thermal energy, or the like. In this way, a change of the quality of the colorant is suppressed, and deterioration of the light-resistance can be suppressed effectively.

Furthermore, since the ultraviolet absorber is enclosed by the condensation-polymerized silane compound, even if the image on the recording paper 41 is exposed to water, the ultraviolet absorber is prevented from exuding into the water. Thus, the ultraviolet-absorbing effect of the ultraviolet absorber can be obtained even after the image is exposed to water, and deterioration of the light-resistance can be suppressed continuously.

Thus, the ink composition of embodiment 1 realizes a high-level light-resistance of an image formed on a recording medium while the water-resistivity of the image is maintained.

In embodiment 1, the ink composition contains a hydrolyzable silane compound as the water-soluble substance that is condensation-polymerized in the absence of water, but the water-soluble substance is not limited thereto. Any type of water-soluble substance may be used so long as the substance is condensation-polymerized to enclose a colorant of ink when an ink drop ejected from the nozzle 14 of the inkjet head 1 is adhered on the recording paper 41, and the water content (solvent) of the ink drop evaporates or permeates into the recording paper 41.

Furthermore, in embodiment 1, the ink composition contains a penetrant. However, the penetrant is not an indispensable constituent of the ink composition of embodiment 1. It should be noted, however, that in the case of using the ink composition containing a penetrant, the solvent of the ink permeates into the recording paper 41 more quickly, and as a result, the water-resistivity of an image formed with the ink is further improved.

Next, specific examples of embodiment 1 are described below.

First, nine types of ink compositions for inkjet recording, which have the compositions shown below, were prepared (Examples 1-1 to 1-9). (It should be noted that the contents of the constituents of each composition are shown in percentage by mass.) All of the ink compositions of Examples 1-1 to 1-9 contain glycerol as a humectant.

The ink compositions contain a dye as a colorant. The ink compositions of Examples 1-1 to 1-6 contain JPD Yellow MT-NL (produced by Nippon Kayaku Co.). The ink compositions of Examples 1-7 to 1-9 contain a dye having a color different from that of JPD Yellow MT-NL.

All of the ink compositions of Examples 1-1 to 1-9 contain an organic silicon compound as the water-soluble substance that is condensation-polymerized in the absence of water. The organic silicon compound was prepared by the following method. First, 120 g (6.67 mol) of water was poured into a reactor having a cooler. A mixture of 35 g (0.2 mol) of 1-trimethoxysilyl-3-aminopropane and 15.2 g (0.1 mol) of tetramethoxysilane was then added to the water in a drop-by-drop fashion while stirring the water in the reactor. After all of the mixture was dropped into the reactor, the temperature of the reactor was increased to 60° C., and the stirring was continued for one hour. Then, the temperature of the reactor was increased to 90° C., and the reaction in the reactor was continued for two hours while stirring the mixture in the reactor. After the reaction, generated methanol was removed by distillation. An organic silicon compound produced in such a way was the organic silicon compound contained in the ink composition of each of Examples 1-1 to 1-9.

EXAMPLE 1-1

The ink composition of Example 1-1 contains a compound of "Chemical Formula 1-1" as an ultraviolet absorber.

| | |
|---|---|
| JPD Yellow MT-NL (produced by Nippon Kayaku Co.) | 5% |
| glycerol | 7% |
| diethylene glycol | 5% |
| organic silicon compound | 5% |
| ultraviolet absorber (Chemical Formula 1-1) | 5% |
| pure water | 73% |

EXAMPLE 1-2

The ink composition of Example 1-2 contains a compound of "Chemical Formula 1-3" as an ultraviolet absorber.

| | |
|---|---|
| JPD Yellow MT-NL (produced by Nippon Kayaku Co.) | 5% |
| glycerol | 7% |
| diethylene glycol | 5% |
| organic silicon compound | 5% |
| ultraviolet absorber (Chemical Formula 1-3) | 5% |
| pure water | 73% |

EXAMPLE 1-3

The ink composition of Example 1-3 contains a compound of "Chemical Formula 1-7" as an ultraviolet absorber.

| | |
|---|---|
| JPD Yellow MT-NL (produced by Nippon Kayaku Co.) | 5% |
| glycerol | 7% |
| diethylene glycol | 5% |
| organic silicon compound | 5% |
| ultraviolet absorber (Chemical Formula 1-7) | 5% |
| pure water | 73% |

EXAMPLE 1-4

The ink composition of Example 1-4 contains a compound of "Chemical Formula 1-13" as an ultraviolet absorber.

| | |
|---|---|
| JPD Yellow MT-NL (produced by Nippon Kayaku Co.) | 5% |
| glycerol | 7% |
| diethylene glycol | 5% |
| organic silicon compound | 5% |
| ultraviolet absorber (Chemical Formula 1-13) | 5% |
| pure water | 73% |

EXAMPLE 1-5

The ink composition of Example 1-5 contains a compound of "Chemical Formula 1-14" as an ultraviolet absorber.

| | |
|---|---|
| JPD Yellow MT-NL (produced by Nippon Kayaku Co.) | 5% |
| glycerol | 7% |
| diethylene glycol | 5% |
| organic silicon compound | 5% |
| ultraviolet absorber (Chemical Formula 1-14) | 5% |
| pure water | 73% |

EXAMPLE 1-6

The ink composition of Example 1-6 contains a compound of "Chemical Formula 1-19" as an ultraviolet absorber.

| | |
|---|---|
| JPD Yellow MT-NL (produced by Nippon Kayaku Co.) | 5% |
| glycerol | 7% |
| diethylene glycol | 5% |
| organic silicon compound | 5% |
| ultraviolet absorber (Chemical Formula 1-19) | 5% |
| pure water | 73% |

EXAMPLE 1-7

The ink composition of Example 1-7 contains the same constituents as those of the composition of Example 1-1 except that a different dye is used in Example 1-7.

| | |
|---|---|
| C.I. Acid Red 289 | 5% |
| glycerol | 7% |
| diethylene glycol | 5% |
| organic silicon compound | 5% |
| ultraviolet absorber (Chemical Formula 1-1) | 5% |
| pure water | 73% |

EXAMPLE 1-8

The ink composition of Example 1-8 contains the same constituents as those of the composition of Example 1-1 except that a different dye is used in Example 1-8.

| | |
|---|---|
| C.I. Direct Blue 199 | 5% |
| glycerol | 7% |
| diethylene glycol | 5% |
| organic silicon compound | 5% |
| ultraviolet absorber (Chemical Formula 1-1) | 5% |
| pure water | 73% |

EXAMPLE 1-9

The ink composition of Example 1-9 contains the same constituents as those of the composition of Example 1-1 except that a different dye is used in Example 1-9.

| | |
|---|---|
| C.I. Direct Black 154 | 5% |
| glycerol | 7% |
| diethylene glycol | 5% |
| organic silicon compound | 5% |
| ultraviolet absorber (Chemical Formula 1-1) | 5% |
| pure water | 73% |

On the other hand, ink having the following composition was prepared for comparison (Comparative Example 1-1). (It should be noted that the contents of the constituents of each composition are shown in percentage by mass.)

COMPARATIVE EXAMPLE 1-1

The ink composition of Comparative Example 1-1 contains a compound of "Chemical Formula 1-21" as an ultraviolet absorber. This ultraviolet absorber does not include an acidic group.

Chemical Formula 1-21

| | |
|---|---|
| JPD Yellow MT-NL (produced by Nippon Kayaku Co.) | 5% |
| glycerol | 7% |
| diethylene glycol | 5% |
| organic silicon compound | 5% |
| ultraviolet absorber (Chemical Formula 1-21) | 5% |
| pure water | 73% |

Light-resistance test was performed on the ink compositions of Examples 1-1 to 1-9 and Comparative Example 1-1. Printed character samples used for this light-resistance test were formed by solid printing using the above ink compositions on plain paper (product name: "Xerox4024"; produced by Xerox Co.) with a commercially-available printer (which ejects the ink using a piezoelectric actuator similar to that of the above-described recording apparatus (except that the thickness of a piezoelectric element is much greater than that of the above-described recording apparatus)) such that each sample has a size of 15 mm×15 mm square.

The light-resistance test was performed as described below. 10 minutes after the printing, the paper having the printed character samples formed thereon was soaked in distilled water for 5 minutes with the printed side down. After being soaked, the paper was dried in air for 30 minutes, and the OD value of each sample was measured. Then, each printed character sample was irradiated at the irradiance of 100 W/m² for 500 hours by Xenon Weather-Ometer Ci5000 (produced by Atlas Material Testing Technology), and the OD value of each printed character sample was measured. Evaluation of the light-resistance is represented by the ratio of the OD value measured before the irradiation and the OD value measured after the irradiation (light-resistance (%)). Results of the light-resistance test are shown in Table 1.

TABLE 1

| | Light Resistance (%) |
|---|---|
| Example 1-1 | 95 |
| Example 1-2 | 96 |
| Example 1-3 | 95 |
| Example 1-4 | 97 |
| Example 1-5 | 97 |
| Example 1-6 | 95 |
| Example 1-7 | 95 |
| Example 1-8 | 98 |
| Example 1-9 | 96 |
| Comparative Example 1-1 | 71 |

As seen from Table 1, each of the ink compositions of Examples 1-1 to 1-9 has the light-resistance of 95% or higher, whereas the ink composition of Comparative Example 1-1 has the light-resistance of 80% or lower.

Since the ultraviolet absorber contained in the ink composition of Comparative Example 1-1 does not have an acidic group, there is no interaction between the ultraviolet absorber and the water-soluble substance (organic silicon compound). It is therefore estimated that the ultraviolet absorber is not enclosed by a condensation-polymerization product when the water-soluble substance is condensation-polymerized. Therefore, it is understood that when an image formed with the ink composition of Comparative Example 1-1 is exposed to water, the ultraviolet absorber is carried away by the water, and as a result, the light-resistance of the image deteriorates.

On the other hand, in the ink composition of each of Examples 1-1 to 1-9, the ultraviolet absorber has an acidic group, and therefore, there is a strong interaction between the ultraviolet absorber and the water-soluble substance (organic silicon compound). It is therefore estimated that the ultraviolet absorber is enclosed together with the colorant by a condensation-polymerization product when the water-soluble substance is condensation-polymerized. Therefore, it is understood that even when an image formed with the ink composition of each of Examples 1-1 to 1-9 is exposed to water, the ultraviolet absorber is not carried away by the water, and as a result, the light-resistance of the image dramatically improved.

The water-resistivity test was performed on the ink compositions of Examples 1-1 to 1-9 and Comparative Example 1-1. It was confirmed that high water-resistivity can be obtained in any of these ink compositions.

Furthermore, it was confirmed that even if an ink composition contains as an ultraviolet absorber any of the compounds of "Chemical Formula 1-1" to "Chemical Formula 1-20" which is not exemplified in the above examples, substantially the same light-resistance can be obtained in such an ink composition. Further still, it was confirmed that, even when a pigment is employed in the ink composition of each of the above examples in place of the dye, the same results as those described for the above examples can be obtained.

(Embodiment 2)

An ink composition for inkjet recording according to embodiment 2 contains a colorant (dye or pigment), a humectant, a penetrant, water, and a water-soluble substance that is condensation-polymerized in the absence of the water, which are also contained in the ink composition of embodiment 1. However, the ink composition of embodiment 2 contains a radical trapping agent having an acidic group in place of the ultraviolet absorber of embodiment 1. This radical trapping agent has a function of trapping peroxyradical or ozone which is generated during the process of thermal oxidation.

The colorant, humectant, penetrant, and water-soluble substance have already been described above in embodiment 1, and therefore, the descriptions thereof are herein omitted.

Specific examples of the radical trapping agent include phenolic compounds and sulfur compounds.

Examples of the acidic group of the radical trapping agent include sodium sulfonate and sodium carboxylate. Among these acidic groups, sodium sulfonate is preferable in consideration of the solubility in water.

Specific examples of the phenolic compounds include compounds of "Chemical Formula 2-1" to "Chemical Formula 2-6" shown below. These compounds can readily be obtained by sulfonating or carboxylating a phenolic compound commercially available as an antioxidant.

Chemical Formula 2-1

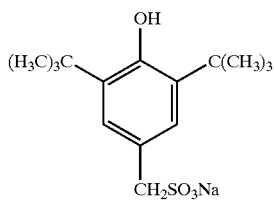

Chemical Formula 2-2

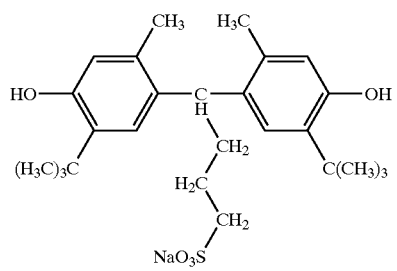

Chemical Formula 2-3

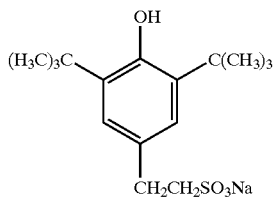

Chemical Formula 2-4

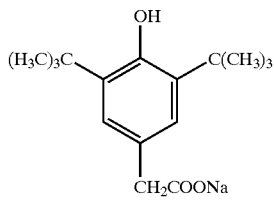

Chemical Formula 2-5

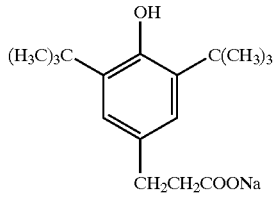

Chemical Formula 2-6

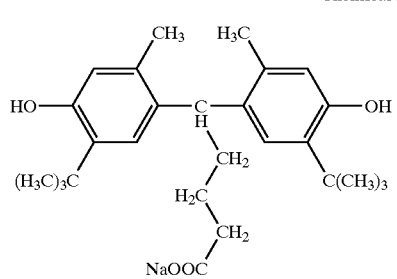

Specific examples of the sulfur compounds include compounds of "Chemical Formula 2-7" to "Chemical Formula 2-16" shown below. These compounds can readily be obtained by sulfonating or carboxylating a sulfur compound commercially available as an antioxidant.

Chemical Formula 2-7

$NaO_3S\text{—}CH_2CH_2\text{—}S\text{—}CH_2CH_2CO\text{—}O\text{—}C_8H_{17}$

Chemical Formula 2-8

$NaO_3S\text{—}CH_2CH_2\text{—}S\text{—}CH_2CH_2CO\text{—}O\text{—}C_{10}H_{21}$ Chemical Formula 2-9

$NaO_3S\text{—}CH_2CH_2\text{—}S\text{—}CH_2CH_2CO\text{—}O\text{—}C_{12}H_{25}$ Chemical Formula 2-10

$NaO_3S\text{—}CH_2CH_2\text{—}S\text{—}CH_2CH_2CO\text{—}O\text{—}C_{14}H_{29}$ Chemical Formula 2-11

$NaO_3S\text{—}CH_2CH_2\text{—}S\text{—}CH_2CH_2CO\text{—}O\text{—}C_{18}H_{37}$ Chemical Formula 2-12

$NaO\text{—}CO\text{—}CH_2CH_2\text{—}S\text{—}CH_2CH_2CO\text{—}O\text{—}C_8H_{17}$ Chemical Formula 2-13

$NaO\text{—}CO\text{—}CH_2CH_2\text{—}S\text{—}CH_2CH_2CO\text{—}O\text{—}C_{10}H_{21}$ Chemical Formula 2-14

$NaO\text{—}CO\text{—}CH_2CH_2\text{—}S\text{—}CH_2CH_2CO\text{—}O\text{—}C_{12}H_{25}$ Chemical Formula 2-15

$NaO\text{—}CO\text{—}CH_2CH_2\text{—}S\text{—}CH_2CH_2CO\text{—}O\text{—}C_{14}H_{29}$ Chemical Formula 2-16

$NaO\text{—}CO\text{—}CH_2CH_2\text{—}S\text{—}CH_2CH_2CO\text{—}O\text{—}C_{18}H_{37}$ An ink composition for inkjet recording according to embodiment 2 contains a colorant, a humectant, a penetrant, water, and a hydrolyzable silane compound employed as the water-soluble substance that is condensation-polymerized in the absence of the water, which are also contained in the ink composition of embodiment 1. When a drop of the ink is adhered onto the recording paper 41, the silane compound is condensation-polymerized to enclose the colorant. Thus, even when an image formed with the ink composition is exposed to water, the colorant is prevented from exuding into the water.

The ink composition of embodiment 2 further contains a radical trapping agent having an acidic group. Because of the acidic group, this radical trapping agent has a strong interaction with a silane compound having an amino group. Thus, in the ink, the radical trapping agent exists in the vicinity of the silane compound as the colorant does. Therefore, when the silane compound is condensation-polymerized, the condensation-polymerized silane compound encloses not only the colorant but also the radical trapping agent. As a result, since the radical trapping agent exists in the vicinity of the colorant on the recording paper 41, even when an image on the recording paper 41 is exposed to peroxyradical and ozone, the peroxyradical and ozone is trapped by the radical trapping agent that exists in the vicinity of the colorant, whereby the colorant is prevented from being attacked by the peroxyradical and ozone. In this way, a change of the quality of the colorant is suppressed, and high-level weatherability can be obtained.

Furthermore, since the radical trapping agent is enclosed by the condensation-polymerized silane compound, even if the image on the recording paper 41 is exposed to water, the colorant is prevented from exuding into the water. Thus, the radical-trapping effect of the radical trapping agent can be obtained even after the image is exposed to water, and deterioration of the weatherability can be suppressed continuously.

Thus, the ink composition of embodiment 2 achieves a high-level weatherability while the water-resistivity of an image formed on a recording medium is maintained.

As in embodiment 1, the ink composition of embodiment 2 also contains a hydrolyzable silane compound as the water-soluble substance that is condensation-polymerized in the absence of water, but the water-soluble substance is not limited thereto.

As in embodiment 1, the ink composition of embodiment 2 also contains a penetrant. However, the penetrant is not an indispensable constituent of the ink composition of embodiment 2. It should be noted, however, that in the case of the ink composition containing a penetrant, the solvent of the ink permeates into the recording paper 41 more quickly, and as a result, the water-resistivity of an image formed with the ink is further improved.

Next, specific examples of embodiment 2 are described below.

First, eight types of ink for inkjet recording which have the compositions shown below were prepared (Examples 2-1 to 2-8). (It should be noted that the contents of the constituents of each composition are shown in percentage by mass.)

All of the ink compositions of Examples 2-1 to 2-8 contain glycerol as a humectant.

The ink compositions contain a dye as a colorant. The ink compositions of Examples 2-1 to 2-5 contain JPD Yellow MT-NL (produced by Nippon Kayaku Co.). The ink compositions of Examples 2-6 to 2-8 contain a dye having a color different from that of JPD Yellow MT-NL.

All of the ink compositions of Examples 2-1 to 2-8 contain an organic silicon compound as the water-soluble substance that is condensation-polymerized in the absence of water. The organic silicon compound used in embodiment 2 was prepared by the same method as that employed for preparing the organic silicon compound of the ink compositions of Examples 1-1 to 1-9 of embodiment 1.

EXAMPLE 2-1

The ink composition of Example 2-1 contains the compound of "Chemical Formula 2-1" as a radical trapping agent.

| | |
|---|---|
| JPD Yellow MT-NL (produced by Nippon Kayaku Co.) | 5% |
| glycerol | 7% |
| diethylene glycol | 5% |
| organic silicon compound | 5% |
| radical trapping agent (Chemical Formula 2-1) | 5% |
| pure water | 73% |

EXAMPLE 2-2

The ink composition of Example 2-2 contains the compound of "Chemical Formula 2-2" as a radical trapping agent.

| | |
|---|---|
| JPD Yellow MT-NL (produced by Nippon Kayaku Co.) | 5% |
| glycerol | 7% |
| diethylene glycol | 5% |
| organic silicon compound | 5% |
| radical trapping agent (Chemical Formula 2-2) | 5% |
| pure water | 73% |

EXAMPLE 2-3

The ink composition of Example 2-3 contains the compound of "Chemical Formula 2-5" as a radical trapping agent.

| | |
|---|---|
| JPD Yellow MT-NL (produced by Nippon Kayaku Co.) | 5% |
| glycerol | 7% |
| diethylene glycol | 5% |
| organic silicon compound | 5% |
| radical trapping agent (Chemical Formula 2-5) | 5% |
| pure water | 73% |

EXAMPLE 2-4

The ink composition of Example 2-4 contains the compound of "Chemical Formula 2-9" as a radical trapping agent.

| | |
|---|---|
| JPD Yellow MT-NL (produced by Nippon Kayaku Co.) | 5% |
| glycerol | 7% |
| diethylene glycol | 5% |
| organic silicon compound | 5% |
| radical trapping agent (Chemical Formula 2-9) | 5% |
| pure water | 73% |

EXAMPLE 2-5

The ink composition of Example 2-5 contains the compound of "Chemical Formula 2-14" as a radical trapping agent.

| | |
|---|---|
| JPD Yellow MT-NL (produced by Nippon Kayaku Co.) | 5% |
| glycerol | 7% |
| diethylene glycol | 5% |
| organic silicon compound | 5% |
| radical trapping agent (Chemical Formula 2-14) | 5% |
| pure water | 73% |

EXAMPLE 2-6

The ink composition of Example 2-6 contains the same constituents as those of the ink composition of Example 2-1 except that a different dye is used in Example 2-6.

| | |
|---|---|
| C.I. Acid Red 289 | 5% |
| glycerol | 7% |
| diethylene glycol | 5% |
| organic silicon compound | 5% |
| radical trapping agent (Chemical Formula 2-1) | 5% |
| pure water | 73% |

EXAMPLE 2-7

The ink composition of Example 2-7 contains the same constituents as those of the ink composition of Example 2-1 except that a different dye is used in Example 2-7.

| | |
|---|---|
| C.I. Direct Blue 199 | 5% |
| glycerol | 7% |
| diethylene glycol | 5% |
| organic silicon compound | 5% |
| radical trapping agent (Chemical Formula 2-1) | 5% |
| pure water | 73% |

EXAMPLE 2-8

The ink composition of Example 2-8 contains the same constituents as those of the ink composition of Example 2-1 except that a different dye is used in Example 2-8.

| | |
|---|---|
| C.I. Direct Black 154 | 5% |
| glycerol | 7% |
| diethylene glycol | 5% |
| organic silicon compound | 5% |
| radical trapping agent (Chemical Formula 2-1) | 5% |
| pure water | 73% |

On the other hand, ink having the following compositions were prepared for comparison (Comparative Examples 1-1 and 2-2). (It should be noted that the contents of the constituents of each composition are shown in percentage by mass.)

COMPARATIVE EXAMPLE 2-1

The ink composition of Comparative Example 2-1 does not contain a radical trapping agent.

| | |
|---|---|
| JPD Yellow MT-NL (produced by Nippon Kayaku Co.) | 5% |
| glycerol | 7% |
| diethylene glycol | 5% |
| organic silicon compound | 5% |
| pure water | 78% |

COMPARATIVE EXAMPLE 2-2

The ink composition of Comparative Example 2-2 contains the same constituents as those of the ink composition of Example 2-1 except that the ink composition of Comparative Example 2-2 contains sodium thiocyanate in place of the radical trapping agent having an acidic group.

| | |
|---|---|
| JPD Yellow MT-NL (produced by Nippon Kayaku Co.) | 5% |
| glycerol | 7% |
| diethylene glycol | 5% |
| organic silicon compound | 5% |
| sodium thiocyanate | 5% |
| pure water | 73% |

The ozone-resistance test, heat-resistance test, and high-temperature/high-humidity resistance test are performed on the ink compositions of Examples 2-1 to 2-8 and Comparative Examples 2-1 and 2-2.

Printed character samples used for these tests were formed by solid printing using the above ink compositions on plain paper (product name: "Xerox4024"; produced by Xerox Co.) with a commercially-available printer (which ejects the ink using a piezoelectric actuator similar to that of the above-described recording apparatus (except that the thickness of a piezoelectric element is much greater than that of the above-described recording apparatus)) such that each sample has a size of a 15 mm×15 mm square. Then, 10 minutes after the printing, the paper having the printed character samples formed thereon was soaked in distilled water for 5 minutes with the printed side down. After being soaked, the paper was dried in air for 30 minutes, and the OD value of each sample was measured. (The OD value measured at this timing is referred to as an "OD value before the ozone-resistance test, heat-resistance test, and high-temperature/high-humidity resistance test".) After this water-resistivity test, each printed character sample is used as an initial sample to perform the following tests.

In the ozone-resistance test, each of the initial samples was left in an ozone atmosphere of 1 ppm and 60% RH at 25° C. for 500 hours, and then, the OD value was measured for each sample.

In the heat-resistance test, each of the initial samples was left in an oven at 80° C. for 500 hours, and then, the OD value was measured for each sample.

In the high-temperature/high-humidity resistance test, each of the initial samples was left in an atmosphere of 80% RH at 70° C. for 500 hours, and then, the OD value was measured for each sample.

The ozone-resistance, heat-resistance, and high-temperature/high-humidity resistance were evaluated based on the ratio (%) of the OD value measured before the tests and the OD value measured after the tests. Results of the tests are shown in Table 2.

TABLE 2

| | Ozone Resistance (%) | Heat Resistance (%) | High-Temperature/ High-Humidity Resistance (%) |
|---|---|---|---|
| Example 2-1 | 96 | 97 | 96 |
| Example 2-2 | 97 | 98 | 96 |
| Example 2-3 | 96 | 97 | 95 |
| Example 2-4 | 95 | 96 | 95 |
| Example 2-5 | 95 | 96 | 95 |
| Example 2-6 | 96 | 96 | 96 |
| Example 2-7 | 96 | 97 | 95 |
| Example 2-8 | 96 | 97 | 95 |
| Comparative Example 2-1 | 79 | 80 | 72 |
| Comparative Example 2-2 | 68 | 71 | 59 |

As seen from Table 2, each of the ozone-resistance, heat-resistance, and high-temperature/high-humidity resistance of each ink composition of Examples 2-1 to 2-8 is 95% or higher, whereas each of the ozone-resistance, heat-resistance, and high-temperature/high-humidity resistance of each ink composition of Comparative Examples 2-1 and 2-2 is 80% or lower.

It is understood that the ink composition of Comparative Example 2-1 has almost no weatherability because it does not contain a radical trapping agent.

As for the ink composition of Comparative Example 2-2, it is estimated that, since an interaction of sodium thiocyanate with a water-soluble substance (organic silicon compound) is weak, sodium thiocyanate was not enclosed by a condensation-polymerized product when the water-soluble substance was condensation-polymerized. Further, it is estimated that, since sodium thiocyanate has high solubility in water, sodium thiocyanate was dissolved into water when a printed character sample was soaked in water. As a result, the weatherability deteriorated after the soaking process.

On the other hand, in the ink composition of each of Examples 2-1 to 2-8, there is a strong interaction between a radical trapping agent and a water-soluble substance because the radical trapping agent has an acidic group. Thus, it is estimated that when the water-soluble substance is condensation-polymerized, the radical trapping agent is enclosed together with the colorant by a condensation-polymerized product. It is therefore understood that even when an image formed with the ink of each of Examples 2-1 to 2-8 is exposed to water, the radical trapping agent is not carried away by the water. As a result, the weatherability is dramatically improved.

The water-resistivity test was performed on the ink compositions of Examples 2-1 to 2-8 and Comparative Examples 2-1 and 2-2. It was confirmed that high water-resistivity can be obtained in any of the ink compositions.

Furthermore, it was confirmed that even if an ink composition contains as a radical trapping agent any of the compounds of "Chemical Formula 2-1" to "Chemical Formula 2-16" which is not exemplified in the above examples, substantially the same weatherability can be obtained in such an ink composition. Further still, it was confirmed that, even when a pigment is employed in the ink composition of each of the above examples in place of the dye, the same results as those described for the above examples can be obtained.

What is claimed is:

1. An ink composition used for inkjet recording, comprising: a colorant; a humectant; water; a water-soluble substance that is condensation-polymerized in the absence of the water; and an ultraviolet absorber having an acidic group.

2. An ink composition according to claim 1, wherein the water-soluble substance is a hydrolyzable silane compound.

3. An ink composition according to claim 1, wherein the ultraviolet absorber is selected from a group consisting of benzophenone compounds, benzotriazole compounds, and salicylate compounds.

4. An ink composition according to claim 1 further comprising a penetrant.

5. An ink cartridge comprising an ink composition for inkjet recording,
wherein the ink composition includes a colorant; a humectant; water; a water-soluble substance that is condensation-polymerized in the absence of the water; and an ultraviolet absorber having an acidic group.

6. An ink cartridge according to claim 5, wherein the ink composition further includes a penetrant.

7. A recording apparatus comprising an ink composition for inkjet recording, the recording apparatus ejecting the ink composition toward a recording medium,
wherein the ink composition includes a colorant; a humectant; water; a water-soluble substance that is condensation-polymerized in the absence of the water; and an ultraviolet absorber having an acidic group.

8. A recording apparatus according to claim 7, wherein the ink composition further includes a penetrant.

9. An ink composition used for inkjet recording, comprising: a colorant; a humectant; water; a water-soluble substance that is condensation-polymerized in the absence of the water; and a radical trapping agent having an acidic group.

10. An ink composition according to claim 9, wherein the water-soluble substance is a hydrolyzable silane compound.

11. An ink composition according to claim 9, wherein the radical trapping agent is selected from a group consisting of phenolic compounds and sulfur compounds.

12. An ink composition according to claim 9 further comprising a penetrant.

13. An ink cartridge comprising an ink composition for inkjet recording,
wherein the ink composition includes a colorant; a humectant; water; a water-soluble substance that is condensation-polymerized in the absence of the water; and a radical trapping agent having an acidic group.

14. An ink cartridge according to claim 13, wherein the ink composition further includes a penetrant.

15. A recording apparatus comprising an ink composition for inkjet recording, the recording apparatus ejecting the ink composition toward a recording medium,
wherein the ink composition includes a colorant; a humectant; water; a water-soluble substance that is condensation-polymerized in the absence of the water; and a radical trapping agent having an acidic group.

16. A recording apparatus according to claim 15, wherein the ink composition further includes a penetrant.

17. An ink composition used for inkjet recording, comprising: a colorant; a humectant; water; a water-soluble substance that is condensation-polymerized in the absence of the water; and an ultraviolet absorber having an acidic group, the acidic group including sodium sulfonate or sodium carboxylate.

* * * * *